Oct. 23, 1951 A. G. GIFFORD 2,572,718

FRICTION DRIVE

Filed Aug. 9, 1946

Inventor

Allen G. Gifford

By Ralph Hammar

Attorney

Patented Oct. 23, 1951 2,572,718

UNITED STATES PATENT OFFICE 2,572,718

FRICTION DRIVE

Allen G. Gifford, Harborcreek, Pa., assignor to Lord Manufacturing Company, Erie, Pa., a corporation of Pennsylvania Application August 9, 1946, Serial No. 689,322

4 Claims. (Cl. 74—206)

Figures 1, 2, 3:
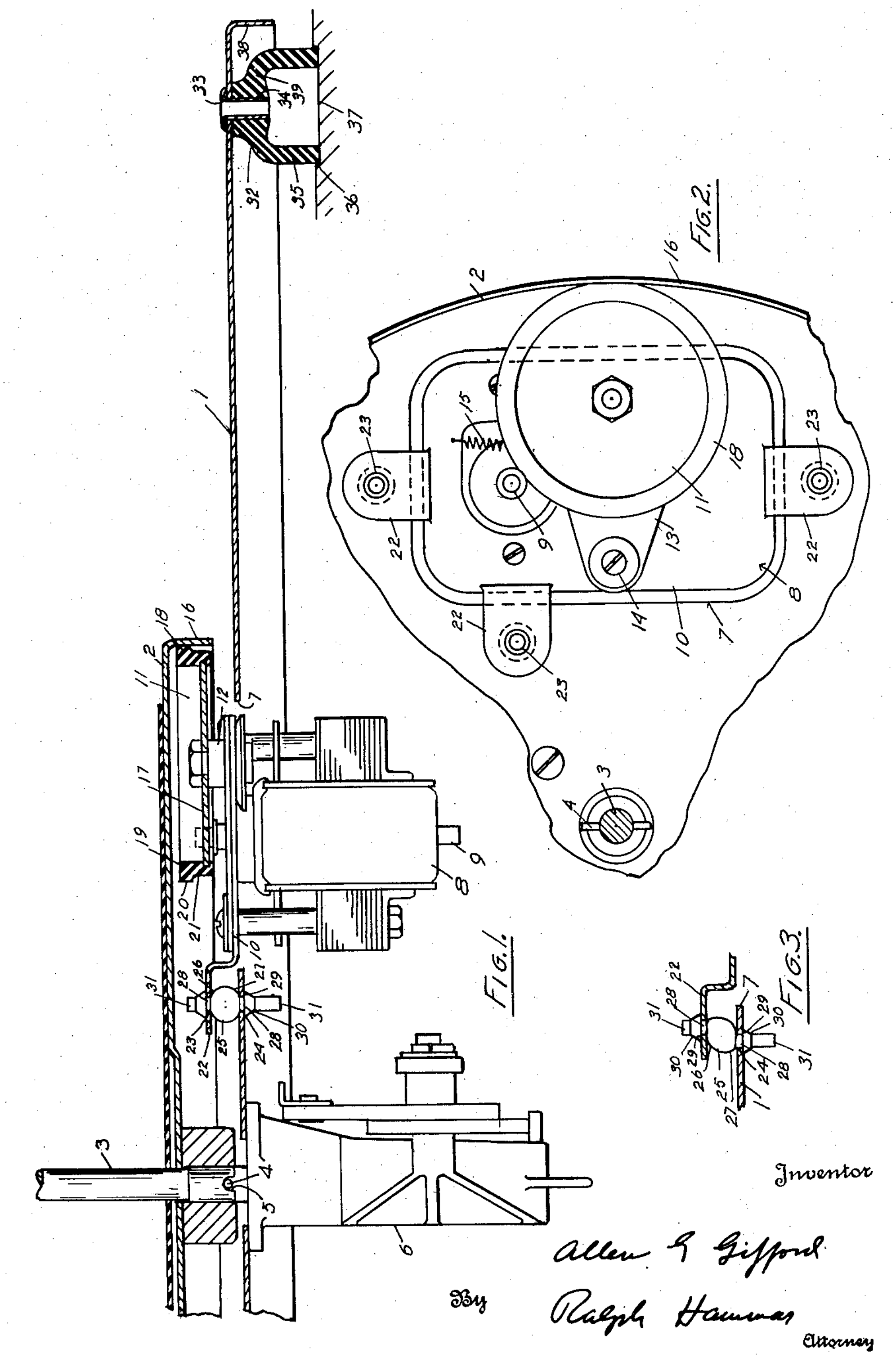

In record players, there is a tendency for the transmission of motor vibration to cabinet, speaker and pick up. There is also a tendency for cabinet vibration (set up by the speaker, for example) to vibrate the tone arm of the record player, and to cause microphonism or "feed-back" resulting in poor reproduction. This invention is intended to reduce the transmission of vibration through an improved resilient mounting for the record player and a cushion drive for the turntable. Further objects and advantages appear in the specification and claims.

In the drawing, Fig. 1 is a fragmentary sectional elevation of a record player showing the cushion drive for the turntable and the resilient mountings supporting the record player in the cabinet, Fig. 2 is a top plan view of the motor and turntable drive, and Fig. 3 is a fragmentary view illustrating the operation of one of the resilient mountings for the motor.

In the drawing, 1 indicates a base plate; 2 indicates a turntable; 3 indicates a spindle releasably connected to the turntable by a pin 4 on the spindle fitting in a notch 5 in the turntable, and 6 indicates the framework supporting the spindle and some of the associated mechanism for automatically changing the records. These parts are or may be of conventional construction.

Beneath the outer part of the turntable is a rectangular opening 7 within which is located a motor 8 having a vertical shaft 9 projecting above the top end plate 10 of the motor. The drive for the motor shaft to the turntable is completed through a pulley 11 journalled in a bushing 12 on an arm 13 pivoted at 14 on the end plate 10. A tension spring 15 connected to the arm 13 urges the arm in the direction to bring the pulley into contact with the motor shaft 9 and with a depending flange 16 at the outer edge of the turntable. Once the spring 15 has brought the idler pulley into contact with the motor shaft and turntable flange, there is a wedging action tending to draw the pulley between the shaft and flange and maintain the friction drive. There is sufficient lost motion in the pivot 14 to permit movement of the pulley arm toward and away from the flange 16.

The pulley comprises a pulley wheel or disk 17 having molded on its outer edge a rubber rim 18 which has a portion 19 extending axially above the disk 17. On the outer surface of the portion 19 is a radially projecting bead 20 which makes frictional driving contact with the turntable. Because the bead 20 is spaced from the disk 17, it is free to yield locally at the point of contact with the turntable flange 16. An intermediate section of rubber 21 between the bead 20 and the disk 17 yields in shear and prevents the transmission of vibration from the motor shaft to the turntable. The friction drive from the shaft to the pulley is confined to the portion of the rim 18 below the bead 20.

The motor is supported on the base plate 1 by lugs 22 extending from the motor end plate 10. In each of the lugs is an opening 23 directly above an opening 24 in the base plate. The motor is supported on the base plate by compression rubber elements 25 having spherical surfaces 26 and 27 in rolling contact with the under surface of the lugs 22 and the upper surface of the base plate. The vertical stiffness of the elements 25 is in part controlled by the radius of curvature of the surfaces 26 and 27. Extending from the upper and lower ends of the elements 25 are projections 28 of reduced cross section loosely received in the openings 23 and 24 and anchored therein by shoulders 29 respectively overlying the upper face of the lugs 22 and the under face of the base plate 1. The outer surfaces of the shoulders 29 are tapered as indicated at 30 and merge into projecting tabs 31 by which the shoulders may be pulled through the openings 23 or 24. After the shoulders have snapped through the openings, the mounting is securely held in place. The tabs 31 are long enough so as to be conveniently gripped. After assembly the excess length may be cut off if desired.

Under torsional or lateral vibration the elements 25 roll on the opposed surfaces of the lugs 22 and the base plate 1 as indicated in Fig. 3. The rolling is resisted by tension of the projections 28 which have a cross section adjusted to provide the desired softness. Because of the spherical surfaces 26 and 27, the displacement indicated in Fig. 3 does not materially change the spacing between the lugs 22 and the base plate. Also the vertical stiffness of the elements 25 is substantially the same in all relative positions of the lug and base plate. This means that the torsional vibration of the motor is cushioned without producing an objectionable vertical reaction and that the stiffness of the mounting in the torsional and vertical directions can be independently adjusted by changes in the relative proportions of the surfaces 26 and 27 and the projections 28.

The base plate of the turntable is supported by rubber feet 32 fastened to the outer edges of the base plate by eyelets 33 pressed into and frictionally held in openings 34. At the lower end of the feet 32 are integral cylindrical sections 35, the lower ends of which fit in sockets 36 in a cabinet base 37.

During shipping, screws may be inserted through the eyelets 33 and screwed into the cabinet base 37, pulling a flange 38 at the outer edge of the base plate 1 or the lower end of eyelet 33 tight against the cabinet base 37.

The hollow cylindrical skirts 35 yield in shear to cushion lateral vibrations. There is also a shear deflection in the curved sections 39 at the upper end of the skirt which cushions vertical vibrations.

In operation the rubber mountings 25—31 isolate the motor vibration from the base plate 1 and prevent transmission of this vibration from the motor to the turntable spindle 3. The local yielding of the axially overhanging shear section 21 of the idler pulley 17 isolates lateral vibration of the motor from the turntable flange. The vibration transmitted to the base plate 1 is isolated from the support 37 by the feet 32, vertical vibration being isolated by the shear sections 39 at the upper ends of the skirts 35 and lateral vibration being isolated by shear deflection of the portions of the skirts 35 between the upper edge of the skirts 36 and the shear sections 39. Also, vibrations set up in the cabinet by airborne disturbances (i. e., sound from the speaker) are prevented from reaching the turntable and pickup by the isolating action of feet 32. Microphonism or "feed-back" which creates a high noise level is therefore prevented and the quality of reproduction improved.

What I claim as new is:

1. In a record player turntable drive of the type in which a pulley makes concurrent frictional contact with a turntable and with a driving member, a pulley having a web with a rim of resilient material such as rubber on the web, said rim having a portion projecting axially from and overhanging the web and having a bead on its outer surface frictionally engaging the turntable, said bead overhanging the web and being free to yield locally radially in shear relative to the rim and web.

2. In a record player, a base rotatably carrying a turntable, a motor resiliently mounted on the base, an idler pulley arranged between the motor shaft and the turntable, said pulley having a web with a rim of resilient material such as rubber on the web frictionally engaging the shaft and the turntable, said rim having a bead axially overhanging the web and connected thereto by a section free to yield radially in shear, said bead being free to yield locally in shear relative to the rim and web and frictionally engaging the turntable.

3. In a record player turntable drive of the type in which a pulley makes concurrent frictional contact with a turntable and with a driving member, a pulley having a web with a rim of resilient material such as rubber on the web, said rim having a restricted annular portion projecting radially beyond the rim body structure and frictionally engaging the turntable, said radially projecting portion being free to yield locally in a radial direction relative to the rim and web, and said web being connected to said rim laterally of said restricted annular portion.

4. In a record player, a base rotatably carrying a turntable, a motor resiliently mounted on the base, an idler pulley arranged between the motor shaft and the turntable, said pulley having a web with a rim of resilient material such as rubber, said rim frictionally engaging the motor shaft and the turntable, the portion of said rim engaging said turntable projecting radially from one peripheral edge portion of the rim, and said rim being connectd to the web by a section spaced laterally from the turntable engaging portion, which section is free to yield locally radially in shear relative to the rim and web.

ALLEN G. GIFFORD.

REFERENCES CITED

The following references are of record in the file of this patent:

UNITED STATES PATENTS

| Number | Name | Date |
|---|---|---|
| 910,901 | Bucherer | Jan. 26, 1909 |
| 2,037,033 | Lord | Apr. 14, 1936 |
| 2,128,216 | Armington | Aug. 30, 1938 |
| 2,421,910 | Hartman | June 10, 1947 |

FOREIGN PATENTS

| Number | Country | Date |
|---|---|---|
| 24,406 | Norway | Mar. 23, 1914 |